United States Patent
Krishnamurthy et al.

(10) Patent No.: US 10,997,409 B1
(45) Date of Patent: May 4, 2021

(54) PROVISIONING INFORMATION TECHNOLOGY (IT) INFRASTRUCTURES BASED ON IMAGES OF SYSTEM ARCHITECTURE DIAGRAMS

(71) Applicant: Amazon Technologies, Inc., Seattle, WA (US)

(72) Inventors: Sandeep Krishnamurthy, Santa Clara, CA (US); Rajankumar Singh, San Jose, CA (US); Aaron Markham, Los Gatos, CA (US); Lai Wei, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 292 days.

(21) Appl. No.: 16/001,618

(22) Filed: Jun. 6, 2018

(51) Int. Cl.
　　*G06K 9/00* (2006.01)
　　*G06K 9/62* (2006.01)
　　*G06T 11/20* (2006.01)
　　*G06N 5/04* (2006.01)

(52) U.S. Cl.
　　CPC ....... *G06K 9/00476* (2013.01); *G06K 9/6256* (2013.01); *G06N 5/046* (2013.01); *G06T 11/206* (2013.01); *G06T 2207/20081* (2013.01)

(58) Field of Classification Search
　　CPC .. G06K 9/00476; G06K 9/6256; G06N 5/046; G06T 11/206; G06T 2207/20081
　　See application file for complete search history.

(56) References Cited

U.S. PATENT DOCUMENTS

| | | | |
|---|---|---|---|
| 2008/0077652 A1* | 3/2008 | Grant | H04L 41/5003 709/203 |
| 2010/0027469 A1* | 2/2010 | Gurajala | H04M 15/68 370/328 |
| 2010/0145749 A1* | 6/2010 | Aiber | G06Q 10/00 705/7.11 |
| 2015/0326535 A1* | 11/2015 | Rao | H04L 63/029 726/15 |
| 2017/0064088 A1* | 3/2017 | Malee | H04W 4/12 |

* cited by examiner

*Primary Examiner* — Yon J Couso
(74) *Attorney, Agent, or Firm* — Nicholson De Vos Webster & Elliott LLP

(57) ABSTRACT

Techniques are described for using machine learning (ML) models to create information technology (IT) infrastructures at a service provider network based on image of IT system architecture diagrams. To create IT system architecture diagrams, system architects often use tools ranging from pen and paper and whiteboards to various types of software-based drawing programs. Based on a user-provided image of an IT system architecture diagram (for example, a digital scan of a hand drawn system diagram, an image file created by a software-based drawing program, or the like), a service provider network uses one or more ML models to analyze the image to identify the constituent elements of the depicted IT system architecture and to create an infrastructure template that can be used to automatically provision corresponding computing resources at the service provider network.

20 Claims, 10 Drawing Sheets

PROVISIONING INFORMATION TECHNOLOGY (IT) INFRASTRUCTURES BASED ON IMAGES OF SYSTEM ARCHITECTURE DIAGRAMS

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
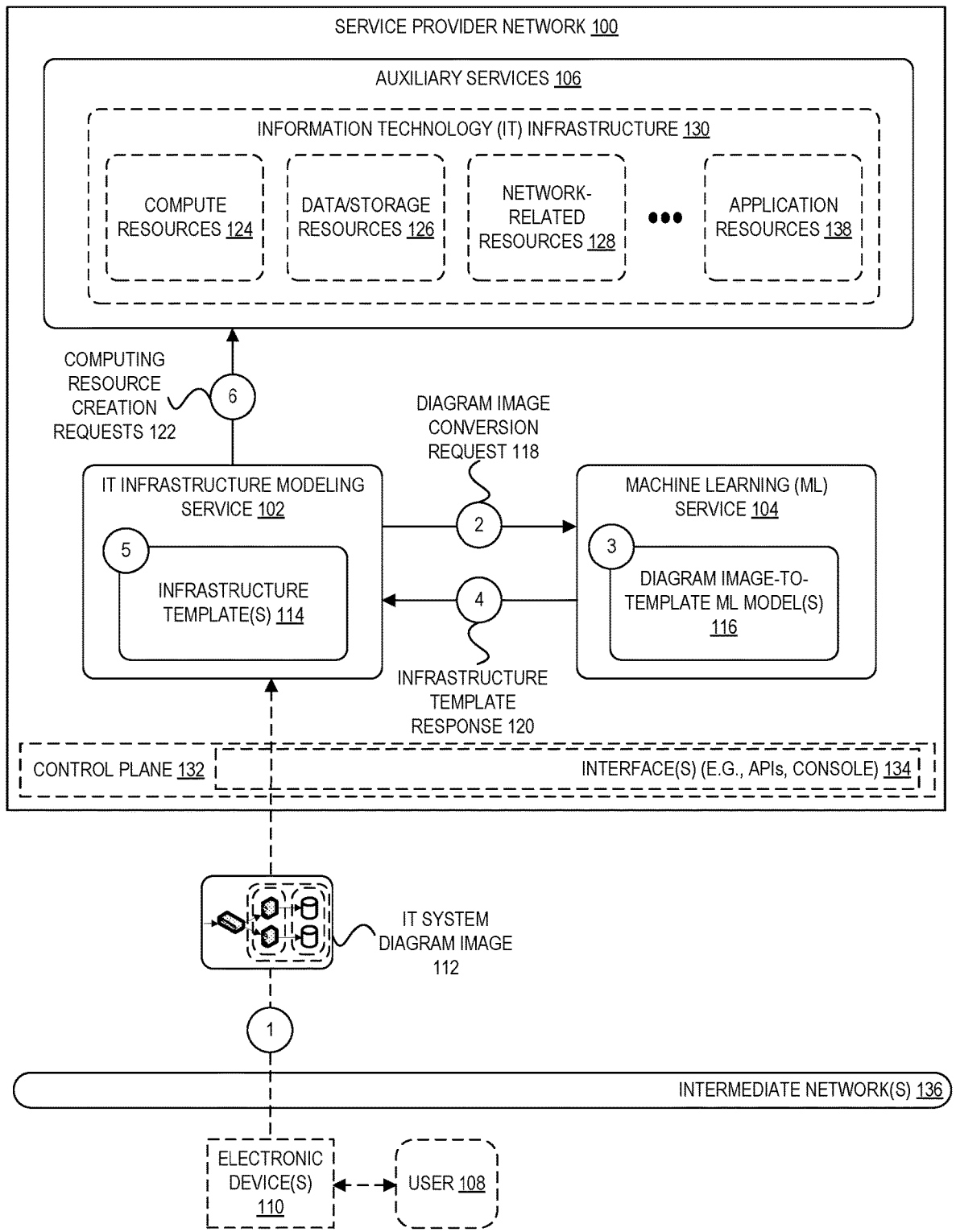
FIG. 1 is a diagram illustrating an environment for using machine learning (ML) models to create information technology (IT) infrastructures at a service provider network based on images of IT system architecture diagrams according to some embodiments.

Various embodiments of methods, apparatus, systems, and non-transitory computer-readable storage media are described for using machine learning (ML) models to create and configure information technology (IT) infrastructures at a service provider network based on images of IT system architecture diagrams. According to some embodiments, a service provider network includes a service that enables users to upload or otherwise provide an image of an IT system architecture diagram, uses one or more ML models to analyze the image to identify constituent computing resources depicted by the IT system architecture diagram (for example, servers, databases, load balancers, network connections, and so forth), and creates an infrastructure template that can be used to automatically provision actual computing resources at the service provider network to implement the depicted IT system architecture. Furthermore, the analysis of an image depicting an IT system architecture diagram and generation of an infrastructure template can include automatically including or suggesting "best practices" configurations and other system design recommendations based on training data used to train the one or more ML models. Among other benefits, system architects and other users can use the service to rapidly progress from early IT system design and prototyping stages to a fully provisioned IT system at a service provider network.

The process of designing and implementing a computerized IT system for any given project can be a complicated task. Depending on the scale and type of applications to be supported by the system, an IT system architecture can be built using a wide variety and arrangement of hardware- and software-based computing resources. For example, an IT system architecture intended to support a growing web-based application can include components such as web servers, application servers, database servers, load balancers, network links between the servers, auto scaling configurations, and so forth. The design of such IT system architectures can include selecting components and component arrangements such that the system satisfies various functional, security, performance, and any other relevant requirements.

For the reasons given above and others, IT system architects often spend large amounts of time and effort designing and testing IT system architectures. In many cases, the process of designing an IT system initially involves creating a system architecture diagram of the IT system to be built, the diagram enabling an IT system architect and others to visualize the IT system before it is created. These diagrams typically include various icons or other types of graphical elements used to represent the components of the IT system—for example, various graphical elements representing servers, databases, load balancers, and so forth—and further used to represent various types of relationships among the components—for example, various graphical elements representing network connections, public and private subnets, virtual private clouds (VPCs), and so forth. Depending on a particular scenario, a system architect can use tools to create such diagrams ranging from pen and paper or a whiteboard to any of a variety of computer-implemented drawing programs such as Visio® or SmartDraw®.

Once a satisfactory IT system diagram is created, an IT system architect or other user is then tasked with translating the diagram into the actual computing resources that will be used to implement the depicted IT system. In some cases, a system architect uses various services of a service provider network to create and configure various types of computing resources at the service provider network, such as web servers and application servers created using a hardware virtualization service, database servers created using a database service, VPCs created using a VPC service, network links between the system components, and various other security and operational settings. The IT system provisioned at the service provider network can then be tested to determine whether it operates as intended, and iterations on the design can be made if issues or inefficiencies are discovered.

Many aspects of the process described above for architecting an IT system are often tedious and time-consuming, particularly as it relates to translating an IT system architecture diagram into the actual computing resources of a service provider network used to implement the IT system. For example, although IT systems used to support various types of web-based applications may require different system components depending on the details of each particular application, many of the computing resources and configurations used will be the same across virtually all web-based applications. Furthermore, the process of configuring even common computing resources can involve a large number of settings, and the complexity of such configurations can increase as more complex types of computing resources and arrangements are introduced.

According to embodiments described herein, a service of a service provider network enables system architects and other users to upload an image of an IT system architecture diagram (for example, a digital scan of a hand drawn diagram, an image file created by a software-based drawing program, or the like), uses one or more ML models to analyze the image to identify the constituent elements of the depicted IT system architecture, and creates a structured data representation of the IT system architecture that can be used to automatically provision computing resources, or a computing resource "stack," at a service provider network used to implement the depicted IT system. In some embodiments, the ML models can be created and trained using various types of deep learning techniques, such deep neural networks, convolutional neural network, and recurrent neural networks, which are capable of identifying types of computing resources represented by various icons and other graphical elements included in the diagrams, determining an appropriate type of computing resource to implement each of the identified computing resources, and generating the structured data representation. In this manner, system architects and other users can use the system to readily and efficiently design, prototype, and implement various types of IT systems.

FIG. 1 is a block diagram illustrating an environment for using ML models to create and configure IT infrastructures at a service provider network based on images of system architecture diagrams. In some embodiments, an IT infrastructure modeling service 102, a ML service 104, and other auxiliary computing resource services 106 operate as part of a service provider network 100 and each comprise one or more software modules executed by one or more electronic devices at one or more geographic locations and data centers managed by the service provider.

A service provider network 100 allows users to use one or more of a variety of types of computing-related resources such as compute resources 124 (for example, executing virtual machine (VM) instances and/or containers, executing batch jobs, executing code without provisioning servers), data/storage resources 126 (for example, object storage, block-level storage, data archival storage), network-related resources 128 (for example, configuring virtual networks including groups of compute resources, content delivery networks (CDNs), Domain Name Service (DNS)), application resources 138 (for example, databases, application build/deployment services), and so forth. These and other computing resources may be provided as services, such as a hardware virtualization service that can execute compute resources 124, a storage virtualization service that can store data objects, and so forth. The users (or "customers") of provider networks 100 may utilize one or more user accounts that are associated with a customer account, though these terms may be used somewhat interchangeably depending upon the context of use. Users may interact with a service provider network 100 across one or more intermediate networks 136 (for example, the internet) via one or more interface(s) 134, such as through use of application programming interface (API) calls, via a console implemented as a website or application, and so forth. The interface(s) 134 may be part of, or serve as a frontend to, a control plane 132 of the provider network 100 that includes "backend" services supporting and enabling the services that may be more directly offered to customers.

To provide these and other computing resource services, service provider networks 100 often rely upon virtualization techniques. For example, virtualization technologies may be used to provide users the ability to control or utilize compute resources 124 (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As indicated above, it is desirable at times for users to create IT infrastructures, for example, an IT infrastructure 130 including any number of computing resources and associated system configurations at service provider networks such as a service provider network 100. As further indicated above, the creation and configuration of such an IT infrastructure 130 can be based on a system architecture diagram designed by a system architect or other user. A user may desire to create an IT infrastructure 130 at a service provider network for any number of reasons including increased scalability and stability provided by service provider networks 100, reduced management and infrastructure costs, the ability to easily verify and test IT infrastructures in an isolated environment, among any number of other reasons.

In one embodiment, at circle "1," an IT system diagram image 112 is provided to an IT infrastructure modeling service 102 of a service provider network 100. As indicated above, an IT system diagram image 112 generally can include any type of graphical diagram representing the architecture of an IT system. In general, the architecture of an IT system specifies a collection of computing resources used to implement the IT system (for example, servers, databases, load balancers, and so forth) and relationships among the computing resources and any other types of relevant computing resource configurations (for example, network connections between resources, security group configurations, availability zone (AZ) groupings, and so forth). In some embodiments, a diagram can illustrate such architectures using graphical elements to represent the various types of computing resources and relationships, for example, one type of graphical element to represent a load balancer, another type of graphical element to represent a web server, yet another type of graphical element to represent a VPC, and so forth.

In one embodiment, a console 134 is configured with user interface elements that allow users (for example, users 108) to upload or otherwise provide a system architecture image 112 to the IT infrastructure modeling service 102 (or to another storage location accessible to the IT infrastructure modeling service 102). In an embodiment, a request used to send a system architecture image 112 to an IT infrastructure modeling service 102 can further include one or more of: an identifier of a user account associated with the user 108 providing the image 112, an indication of a general type of diagram represented by the image 112, desired system parameters in terms of performance, cost, and so forth, an indication of whether the user desires to have a corresponding IT system automatically provisioned at the service provider network 100 or whether the user desires to confirm the system details before creation, and so forth. For example, the user 108 can use an interface 134 (for example, a console) to identify a location of the IT system diagram image 112 and the input may cause an electronic device 110 to issue a request (for example, an API call, a HyperText Markup Language (HTML) form submission, and so forth) sent to the service provider network 100. In other embodiments, an IT system diagram image 112 or portion thereof can be sent to the IT infrastructure modeling service 102 automatically in response to a user saving a copy of the image 112, sending the image 112 to a different service of the service provider network 100, in response to a user drawing a portion or all of the image 112 (for example, using a software-based drawing application or using a network-connected, digital whiteboard), or in response to any other type of input.

Figure 2:
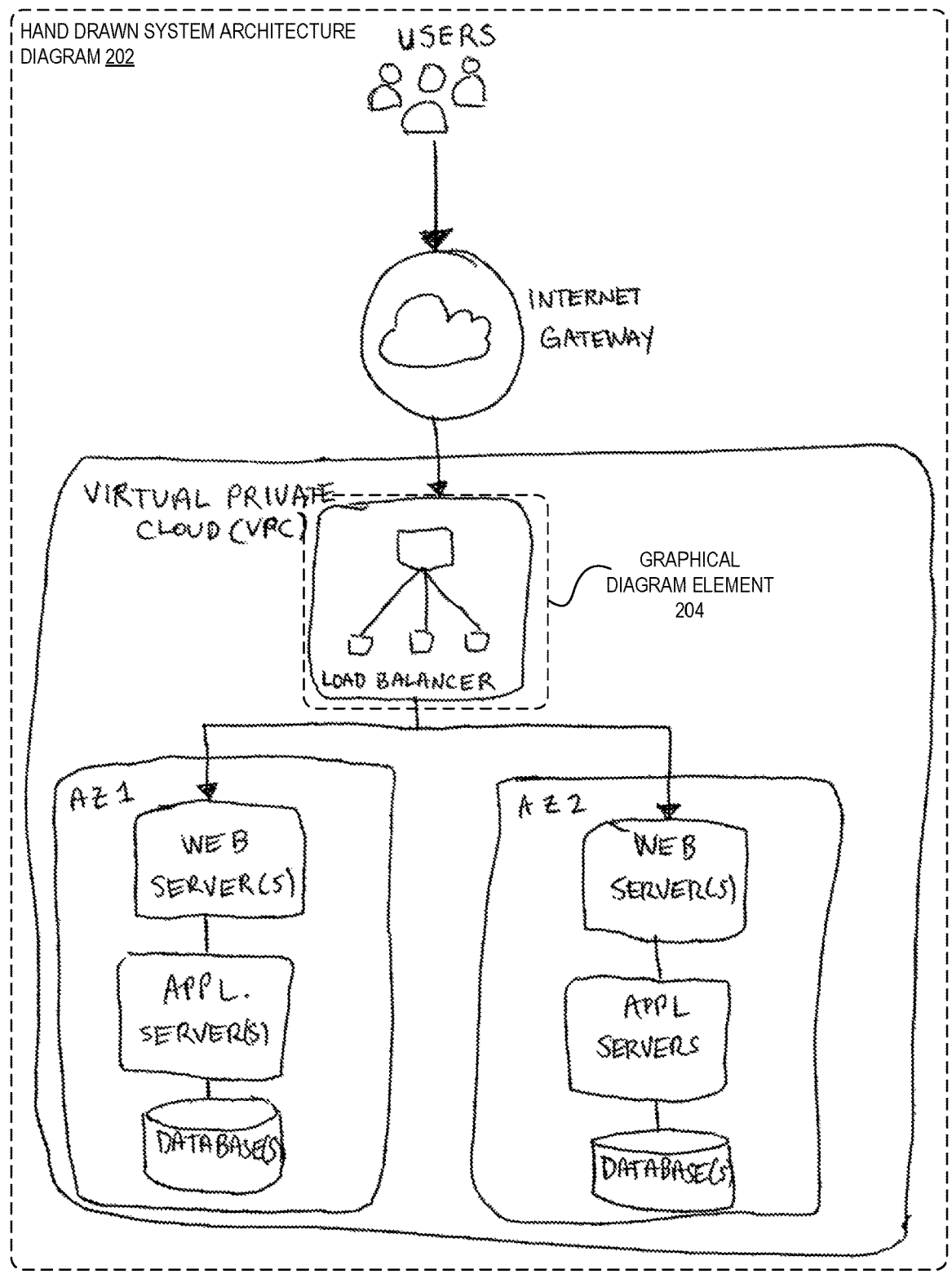
FIG. 2 shows an example image of an IT system architecture diagram according to some embodiments.

FIG. 2 shows an example of a hand drawn diagram of an IT system architecture. The example IT system architecture diagram 202 shown in FIG. 2 depicts a system architecture that can be used to implement a simple web-based application. As shown in FIG. 2, the IT system architecture diagram 202 includes various graphical elements representing different types of computing resources, including system components such as servers and databases, and further includes lines with arrows and graphical elements representing connections and other types of relationships among the components. For example, a graphical diagram element 204 is shown and that is intended to represent a load balancer, as indicated by the square box depicting a load balancer icon in the interior of the box. Although the example graphical diagram element 204 also includes a "load balancer" label to further indicate what the graphical element is intended to represent, in other examples, some or all of the graphical elements may not include any such textual labels or representative icons.

As indicated above, the creation of a hand drawn system architecture diagram, such as that shown in FIG. 2, can be accomplished using a wide variety of drawing tools including physical tools such as pen and paper, whiteboards, and so forth, or similar "hand drawn" images can be created using various types of computer-aided drawing tools and applications on mobile devices, tablet computers, or other types of computing devices. The representation of system architectures in such diagrams can involve varying levels of complexity. For example, a simple architecture diagram can include graphical elements representing servers, databases, and the like, and basic network connections among such components. More complex diagrams can include representations of basic computing resources and other resources, such as data streams, load balancers, content delivery networks (CDNs), and the like, and other types of component relationships including security groups, VPCs, and so forth.

In an embodiment, an image 112 of a system architecture diagram that can be sent over a network to a service provider network 100 can be created in a number of ways depending on the tools used to create the diagram. For example, if a diagram is hand drawn using a sheet of paper, a digital scan of the diagram can be created using an image scanner. If the diagram is created using a standard whiteboard, a digital camera can be used to create a digital picture of the diagram. If the diagram is created using a software-based drawing application, the image can be created by printing the diagram to an image file (for example, a Portable Document Format (PDF) file, a Joint Photographic Experts Group (JPEG) file, and so forth). In some embodiments, a diagram image can be created using a graphical user interface (GUI) provided by the IT infrastructure modeling service 102 or other service of the service provider network 100.

In some embodiments, a system architect or other user can create a system architecture diagram using a standardized set of graphical elements representing various types of computing resources, some or all of which may correspond to specific types of computing resources offered by a service provider network 100 at which the depicted IT system is to be implemented. For example, a same icon can be learned by a system architect and used to represent web servers, load balancers, or other components across different diagrams. As described below, if an IT system architecture diagram uses standard icons to represent known computing resources offered by a service provider, the icons can be translated directly to the corresponding types of service provider network resources. In other examples, an IT system architecture diagram can include one or more non-standardized icons and the IT infrastructure modeling service 102 and ML service 104 can perform other recognition processes when such non-standard graphical elements are included.

In some embodiments, an IT infrastructure modeling service 102 performs one or more operations on the image 112 to prepare the image for further processing by the ML service 104. For example, the IT infrastructure modeling service 102 or other service can perform operations to reduce noise in the image, including adjusting the brightness and contrast of the image, removing digital artifacts of the scanning process, and so forth. In some examples, a user may provide multiple images 112 that are stitched together appropriately so that an entire system is depicted in a single image.

As indicated above, the example hand drawn system architecture diagram 202 shown in FIG. 2 includes various graphical elements used to represent components of the system. In some embodiments, a person creating an architecture diagram can also include annotations in the diagram to provide additional information about the depicted components of the system. These annotations can be used to assist a ML service 104 with identifying the graphical elements in a given system architecture image, and can also be used as part of training data to help train a diagram image-to-template ML model 116 to recognize similar graphical elements in the future (for example, a textual label annotation may identify an otherwise unrecognized graphical element as a web server or a database and that mapping can be used to identify similar graphical elements in subsequent images).

Figure 3:
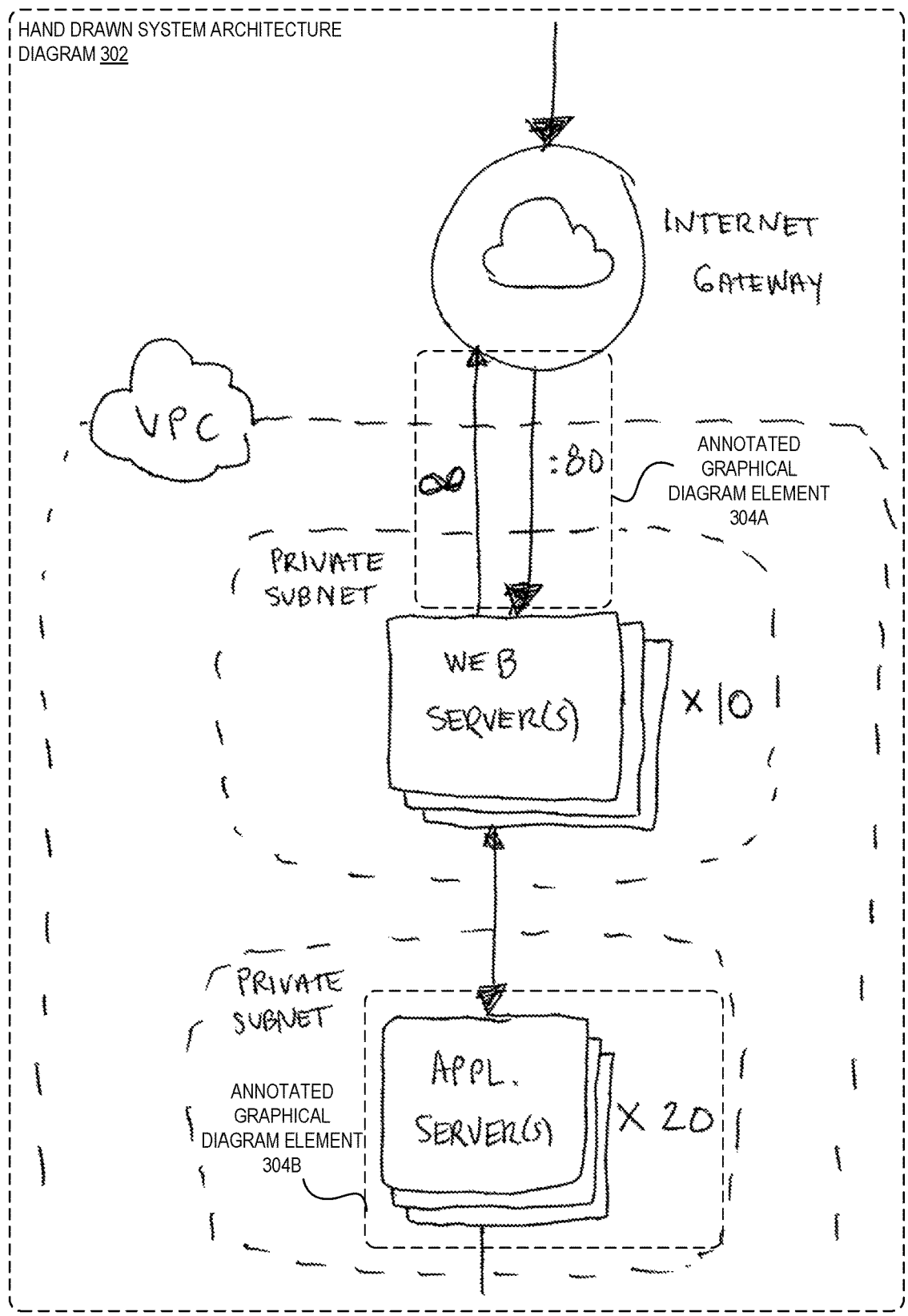
FIG. 3 shows an example image of an IT system architecture diagram including various types of annotations according to some embodiments.

FIG. 3 shows an example hand drawn image of an IT system architecture diagram including various types of annotations. Similar to the diagram depicted in FIG. 2, the IT system architecture diagram 302 shown in FIG. 3 depicts graphical elements representing different types of computing resources that might be used to implement a web-based application, including web servers, application servers, a VPC, and so forth. Some of the graphical elements shown in FIG. 3 include annotations providing additional context or configuration information for the associated graphical elements.

One example use of an annotation is to specify configuration settings associated with a component included in the diagram. For example, the annotated graphical diagram element 304A illustrates a network connection between an internet gateway and web servers within a VPC. The annotations in this example provide additional security-related settings to be applied to the network connection between the components. For example, in FIG. 3, the annotated graphical diagram element 304A includes the label ":80" next to the inbound network connection and the label "Go" next to the outbound network connection, indicating that only requests using port 80 are allowed to be sent to the web server, but outbound traffic using any port is to be allowed. Similar to above, another example of an annotation is the use of arrows on connection lines to indicate directionality of network connections, as shown on the connection lines of annotated graphical diagram element 304A. In general, the types of annotations that can be used can be dependent on the type of computing resources to which the annotations are applied and can include different types of annotations at each layer of the Open Systems Interconnection (OSI) model.

Another example use of an annotation is to concisely indicate in a diagram that a system includes a relatively large number of a particular type of computing resource, as illustrated by annotated graphical diagram element 304B. For example, consider an architecture including a load balancer and tens or hundreds of servers supporting the system behind the load balancer. In this example, a system architect can use a stack of "cards" annotation similar to that shown by annotated graphical diagram element 304B, and can further include a number associated with the stack indicating a number of resources represented by the graphical elements (twenty application servers in the example of annotated graphical diagram element 304B). This information can be used by the IT infrastructure modeling service 102, for example, to create an infrastructure template configured to create the specified number of computing resources. In some embodiments, another type of annotation can include an "unknown" element (for example, a graphical question mark or other type of "wildcard" annotation) indicating that a user is unsure about an appropriate computing resource or appropriate settings for a portion of the IT system being drawn. In an embodiment, a diagram image-to-template ML model 116 can be used to provide recommendations for possible computing resources or settings to use in place of the "unknown" element based on the other identified components of the system.

In an embodiment, at circle "2," the IT infrastructure modeling service 102 receives the IT system diagram image 112 and sends a diagram image conversion request 118 to a ML service 104 requesting conversion of the system architecture image 112 into an infrastructure template 114. While the example in FIG. 1 shows the IT infrastructure modeling service 102 sending a request 118 to the ML service 104, in other embodiments, users 108 or other applications or services can send similar requests directly to the ML service 104. In an embodiment, the diagram image conversion request 118 can include one or more of: a copy of the IT system diagram image 112 or an identifier of a storage location storing the image, an identifier of a user account associated with the request, and other possible parameters. In an embodiment, the request can be generated automatically in response to the IT infrastructure modeling service 102 receiving the IT system diagram image 112, or in response to a user providing input to a GUI or other interface requesting the conversion of a previously uploaded image.

In an embodiment, at circle "3," the ML service 104 uses one or more diagram-to-template ML model(s) 116 to generate an infrastructure template 114 based on the received diagram image conversion request 118. In general, a diagram-to-template ML model 116 can be any type of ML model that is capable of receiving an image depicting an IT system diagram as input and generating output comprising a structured data representation of computing resources identified in the diagram. In some embodiments, a diagram-to-template ML model 116 is based on an artificial neural network, a deep neural network, a recurrent neural network, a convolutional neural network, or other type of ML technique(s).

In one embodiment, one or more diagram-to-template ML models 116 are created using training data consisting of input-output data pairs corresponding to IT system diagrams, or portions thereof, as inputs and structured data representing the corresponding IT systems as outputs. For example, a deep neural network or recurrent neural network can be trained using example system architecture diagrams created by system architects for past projects and example infrastructure templates that were manually created by the architects based on the diagrams as well as diagram-to-infrastructure pairs created specifically for training. A diagram image-to-template ML model 116 can be trained initially to recognize common diagram components such as, for example, databases web servers, and common types of connections between the components such as, for example, a connection between a web server and a database server backend. The training can further include training data sets with diagrams including more complex computing resources and resource relationships, as well as hand drawn images including various types of annotations as described above, such as annotations to identify particular types of computing resources, to indicate various types of resource settings and configurations, and to indicate various types of resource groupings.

In an embodiment, the processing of an IT system diagram image 112 by one or more diagram image-to-template ML models 116 can include one or more of: identifying discrete graphical elements depicted in the image, identifying relationships between the identified graphical elements, determining a type of computing resource represented by each of the discrete graphical elements, determining a type of computing resource offered by a service provider network that can be used to implement each of the identified graphical elements, recommending "best practices" settings based on the identified graphical elements, and so forth. The operations described above can, in some embodiments, be processed collectively using a single ML model or, in other examples, processed using a pipeline of two or more separate ML models.

In some embodiments, the process of an analyzing an IT system diagram image 112 can be user-assisted to aid with the recognition of diagram components and the mapping of identified components to desired computing resources. For example, a first step may include using a ML model 116 comprising an object detection network that detects individual components in the diagram (for example, a load balancer, a database, a private subnet, and so forth). Once the ML service 104 has attempted identifying the components depicted in the diagram, this information can be provided back to the IT infrastructure modeling service 102, which can then generate a GUI or other interface where a user 108 can make edits to the identified components or manually identify components that were not able to be recognized by the ML service 104. The collection of identified components can then be fed into a next ML model that detects connections and groupings of the components. The IT infrastructure modeling service 102 can then generate a subsequent GUI interface where the user can view and, if desired, modify the details of the complete IT system to be created. In an embodiment, a separate ML model 116 can further be used to detect, based on the details of the complete IT system, "best practices" system settings and various other security settings that are suited for the previously identified components and component connections. The user can then be presented with a textual structured data representation of the system that can be further modified, if desired. In other examples, the IT infrastructure modeling service 102 can generate a GUI including a diagram representation of the system and the user can select particular displayed components to view a corresponding structured data representation for the components.

Figure 4:
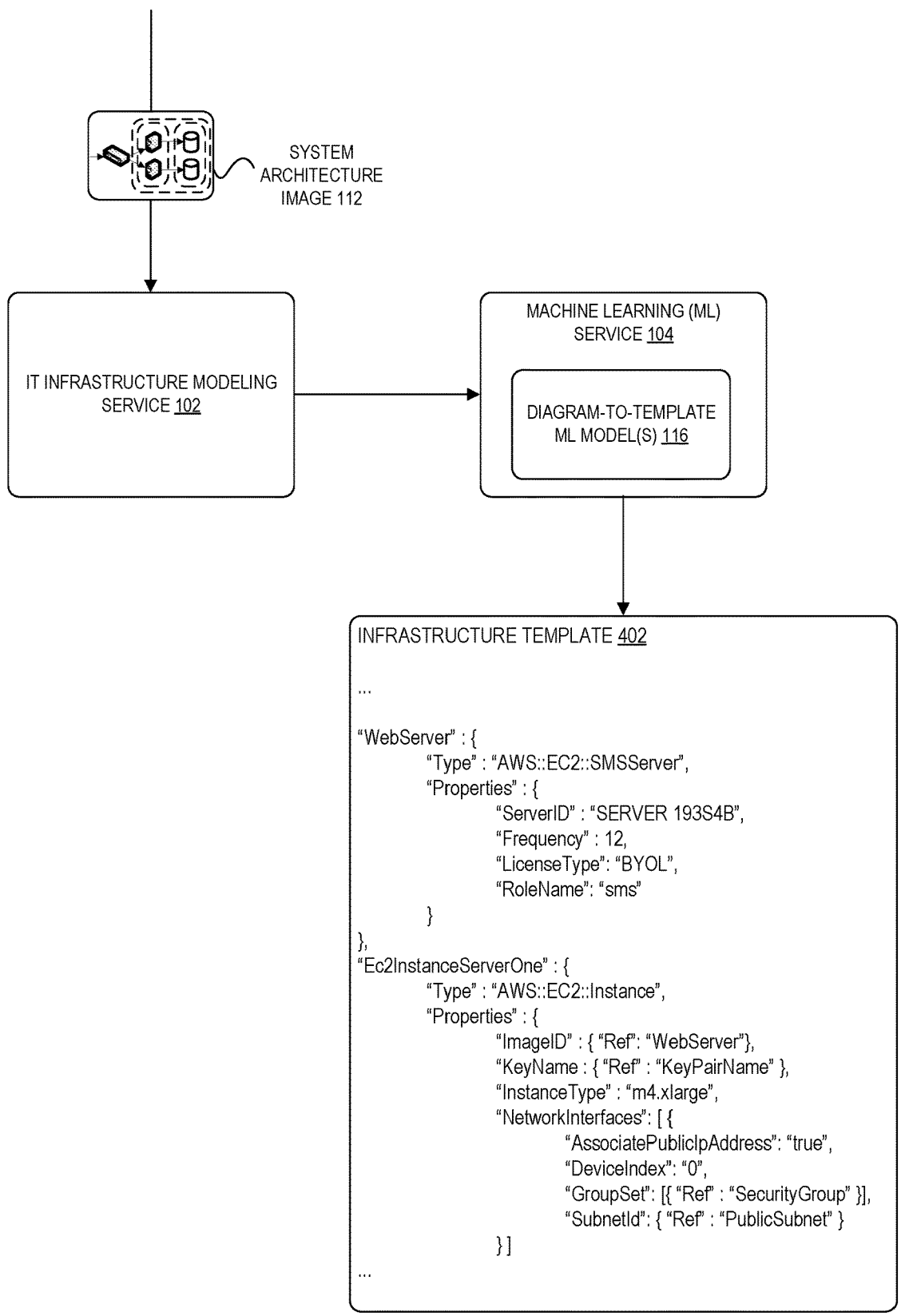
FIG. 4 shows an example of using a ML model to convert an image of an IT system architecture diagram into a corresponding infrastructure template according to some embodiments.

FIG. 4 illustrates an excerpt of an example structured data representation of an IT system created based on an image of an IT system architecture diagram. In FIG. 4, for example, an IT system architecture image 112 is received by an infrastructure modeling service 102 and converted into an infrastructure template 114 by the ML service 104 using one or more diagram-to-template ML model(s) 116.

The infrastructure template 402 shown in FIG. 4 includes an excerpt describing a web server that is to be part of the IT infrastructure represented by the system architecture depicted in the image 112. In FIG. 4, for example, the infrastructure template 402 describes a server identified as a "WebServer" and includes various settings related to the server. For example, the description includes a "ServerID" property that specifies an identifier of the server, a server license type, and an associated server role. The template further includes information about the configuration of the server including a server instance type to be used (for example, "m4.xlarge"), network settings (for example, specified by the "AssociatePublicIpAddress" and "SubnetId" properties), and security settings (for example, specified by the "SecurityGroup" property). As indicated above, the ML service 104 can generate the settings related to the server based on graphical elements and annotations identified in the image 112 and, optionally, by using default or recommended settings associated with such servers where the diagram is not specific.

Additional examples of resources that can be defined in an infrastructure template 114 are illustrated below. For example, the following is an example definition of a virtual private cloud (VPC) that may be identified in a system architecture image 112:

```
"VPC": {
  "Type": VPC",
  "Properties": {
    "CidrBlock": "170.20.0.0/16",
    "EnableDnsSupport": true,
    "EnableDnsHostnames": true,
    "InstanceTenancy": "default",
    "Tags": [{
      "Key": "Name",
      "Value": {
        "Ref": "StackName"
      }
    }]
  }
},
```

The following is an example definition of a public subnet:

```
"PublicSubnet": {
  "Type": "Subnet",
  "Properties": {
    "VpcId": {
      "Ref": "VPC"
    },
    "CidrBlock": "172.31.0.0/24",
    "MapPublicIpOnLaunch": "true",
    "Tags": [{
      "Key": "Name",
      "Value": {
        "Ref": "StackName"
      }
    }]
  }
},
```

The following is an example of a security group definition, including example ingress rules:

```
"SecurityGroup": {
  "Type": "SecurityGroup",
  "Properties": {
    "GroupDescription": "Enable
    HTTP access via port 80 and
    SSH access.",
    "VpcId": {
      "Ref": "VPC"
    },
    "SecurityGroupIngress": [
      {
        "IpProtocol": "tcp",
        "FromPort": "80",
        "ToPort": "80",
        "CidrIp": "0.0.0.0/0"
      },
```

-continued

```
    {
        "IpProtocol": "tcp",
        "FromPort": "22",
        "ToPort": "22",
        "CidrIp": {
            "Ref": "SSHLocation"
        }
    }]
  }
},
```

The following is an example definition of a web server and a database server:

```
"WebServer" : {
    "Type" : "SMSServer",
    "Properties": {
        "ServerId": "s-68a541344",
        "LicenseType": "BYOL",
        "RoleName": "sms"
    }
},
"DBServer" : {
    "Type" : "SMSServer",
    "Properties": {
        "ServerId": "s-68a54634",
        "LicenseType": "BYOL",
        "RoleName": "sms"
    }
},
"Ec2InstanceServerOne" : {
    "Type" : "Instance",
    "Properties" : {
        "ImageId" : { "Ref": "WebServer"},
        "KeyName" : { "Ref" : "KeyPairName" },
        "InstanceType": "m4.xlarge",
        "NetworkInterfaces": [{
            "AssociatePublicIpAddress": "true",
            "DeviceIndex": "0",
            "GroupSet": [{ "Ref" : "SecurityGroup" }],
            "SubnetId": { "Ref" : "PublicSubnet" }
        }],
        "Tags": [{
            "Key": "Name",
            "Value": {
                "Ref": "StackName"
            }
        }]
    }
},
"Ec2InstanceDBServer": {
    "Type": "Instance",
    "Properties": {
        "ImageId": { "Ref": "DBServer"},
        "KeyName": {
            "Ref": "KeyPairName"
        },
        "InstanceType": "m4.xlarge",
        "NetworkInterfaces": [{
            "AssociatePublicIpAddress": "true",
            "DeviceIndex": "0",
            "GroupSet": [{
                "Ref": "SecurityGroup"
            }],
            "SubnetId": { "Ref": "PublicSubnet" }
        }],
        "Tags": [{
            "Key": "Name",
            "Value": { "Ref": "StackName" }
        }]
    }
}
```

As indicated above, the example portion of the infrastructure template 402 shown in FIG. 4 illustrates example settings related to one particular server of the IT infrastructure to be created. However, a same infrastructure template 114 can include settings related to any number of additional servers of an IT infrastructure 130 to be created at the service provider network 100, as well settings related to other types of resources such as, for example, load balancers, firewalls, and so forth, and any other types of system settings, as illustrated above. In other examples, separate infrastructure templates 114 can be created for different computing resources identified in an IT system diagram image 112, or for different portions of an image 112. The format of the infrastructure template 402 shown in FIG. 4 and elsewhere herein is provided for illustrative purposes only; other infrastructure templates can be represented in any textual format or other type of structured data format.

As indicated above, part of the creation of an infrastructure template 114 by a diagram image-to-template ML model 116 can include supplementing or modifying a template with "best practices" components and settings. For example, if an architecture diagram uploaded by a user includes a load balancer in front of two more servers, best practices may indicate that each of the servers behind the load balancer are to be part of a same private subnet. Furthermore, best practices might indicate that the servers are to be distributed across multiple availability zones to improve availability and resiliency of the servers. In one embodiment, the application of such best practices information can be based on training data that is provided during the generation of the diagram image-to-template ML model(s) 116 and can be included in an infrastructure template 114 by the ML service 104 or IT infrastructure modeling service 102.

In an embodiment, the IT infrastructure modeling service 102 or ML service 104 can also recommend types of computing resources that may not be depicted in the image. For example, a user may not be aware of some types of computing resources offered by a service provider network 100, but may create an IT system diagram image 112 for which those types of resources are well-suited. In this example, diagram image-to-template ML model(s) 116 can be used to recommend such resources to a user as part of a generated infrastructure template 114. In an embodiment, these resources may be presented to a user in a GUI or other interface as recommendations and the interface can request user confirmation before adding the suggested resources to a corresponding infrastructure template 114.

In some embodiments, the IT infrastructure modeling service 102 includes a training interface that allows users to train the system to identify components drawn by the user. For example, the IT infrastructure modeling service 102 may include a GUI that requests users to draw individual graphical elements (for example, graphical elements that the particular user uses to represent web servers, load balancers, and so forth) and to identify the computing resources represented by each of the graphical elements. This information can be used to train a diagram image-to-template ML model 116 that can be used universally or specifically for the user to process subsequent images received by the IT infrastructure modeling service 102.

In one embodiment, a ML service 104 can be used to identify system components in real-time as an IT system diagram image 112 is being created. For example, a ML service 104 can receive real-time input from a software-based drawing application or network-connected, digital whiteboard while a user is drawing a system diagram. In this example, the ML service 104 can attempt to identify each graphical element as it is drawn by the user and send back data indicating the service's best guess for what the graphical element represents. The drawing application can display to the user the identification information returned by the ML service 104 or can use the data to automatically redraw the graphical element on the display using a standardized icon. In this manner, a user can see what the ML service 104 believes each graphical element to represent and the user can correct the diagram as desired while the user is drawing the diagram instead of waiting until the diagram is complete and uploaded to the IT infrastructure modeling service 102.

In an embodiment, at circle "4," the ML service 104 sends a template response 120 including at least one infrastructure template 144 describing the computing resources and associated system configurations identified in the image 112. As indicated above, an infrastructure template 114 is a structured data representation of a collection of computing resources and other system settings that can be used by an IT infrastructure modeling service 102 or other services of a service provider network 100 to create the computing resources described in the template. The information describing a server in an infrastructure template 114 can include, for example, server identifiers, IP addresses, MAC addresses, a base operating system, an amount and type of CPUs, an amount of RAM, an amount of storage, and so forth, and the IT infrastructure modeling service 102 can use this information to create and configure a corresponding server at a hardware virtualization service of the service provider network 100.

In an embodiment, at circle "5," the IT infrastructure modeling service 102 receives the infrastructure template 114 and, optionally, displays the infrastructure template to the user. In one embodiment, the IT infrastructure modeling service 102 can generate a GUI displaying the text of the infrastructure template 114 or a graphical depiction of the resources represented by the template (for example, a system diagram similar to that included in the IT system diagram image 112). If a graphical depiction of the computing resources is generated, the displayed resources can be selectable such that a user can select a resource and cause display of associated attributes and settings associated with the resource. The user can use the GUI to modify which computing resources are included in the template or to modify any of the settings associated with the described computing resources. In some embodiments, the infrastructure template is formatted as a JavaScript Object Notation (JSON) file, a YAML Ain't Markup Language (YAML) file, or other type of structured data representation.

In an embodiment, at circle "6," the IT infrastructure modeling service 102 uses the infrastructure template 114 created by the ML service 104, and optionally modified by a user 108, to provision the computing resources described in the template at the service provider network 100. The IT infrastructure modeling service 102 generates any number of computing resource creation requests 122 to various services of the service provider network 100 to create and configure the computing resources described in the template. The IT infrastructure modeling service 102 may generate the computing resource creation requests 122 in response to receiving the infrastructure template response 120 from the ML service 104 or in response to a user providing input requesting the creation of the IT infrastructure 130 described in the template received from the ML service 104.

In some embodiments, once an IT infrastructure 130 is created by the IT infrastructure modeling service 102, a service or application of the service provider network 100 can monitor the performance of the IT infrastructure 130 and use this information to assess whether changes are recommended for the infrastructure 130. For example, a system architect may have an idea of a desired IT system architecture and provision a prototype system as described above; however, once the system is created, the IT infrastructure modeling service 102 or other service may discover that the provisioned system provides suboptimal performance in terms of throughput or any other performance measure, or that the system is overprovisioned and can be scaled back. In this example, the IT infrastructure modeling service 102 and ML service 104 can further analyze the corresponding infrastructure template 114 and suggest modifications to increase the performance of the system. The suggested modifications, for example, may be based on an ML model 116 that is trained with data including system components and configurations known to increase the performance of similar systems. In some embodiments, one or more ML models can be used to periodically adjust various parameters of the provisioned system and/or parameters of individual computing resources of the system, and the modified system can be monitored as the parameters are adjusted to determine an optimal configuration of the system based on performance demands. A provisioned system can be tested using a variety of testing techniques, including using fuzz testing, stress testing, generating synthetic data, and so forth.

In one embodiment, a user can provide an image 112 and request the IT infrastructure modeling service 102 to generate an infrastructure template 114 that highlights differences between an existing IT infrastructure. For example, a user may create an IT system diagram image 112 for a first iteration of an IT system and analyze an IT infrastructure 130 created based on the image 112. The user may then make one or more changes to the original diagram image 112, provide the updated image to the IT infrastructure modeling service 102 and request a display indicating differences between the original IT system and the updated IT system. The user can use this information to determine whether the proposed modifications are desired based on the user's analysis of the existing IT infrastructure 130. If the user agrees with the proposed modifications, the user can instruct the IT infrastructure modeling service 102 to perform the requested updates to the IT infrastructure 130. A user can use this process, for example, to iteratively develop a system architecture using a same diagram as a starting point.

Figure 5:
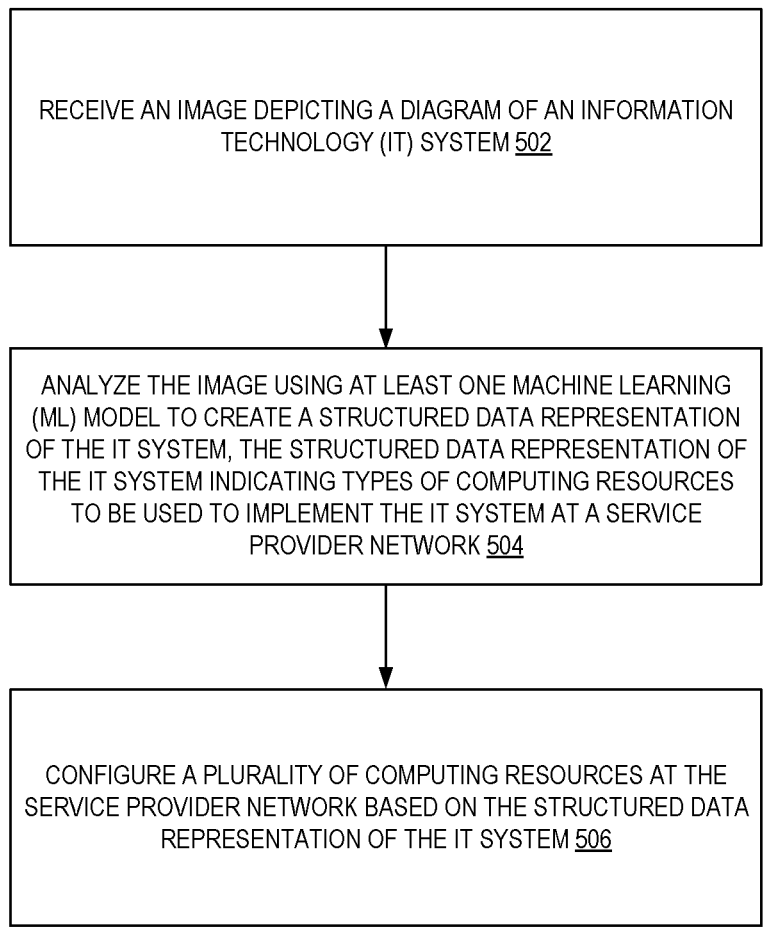
FIG. 5 is a flow diagram illustrating operations for using ML models to create IT infrastructures at a service provider network based on images of IT system architecture diagrams according to some embodiments.

FIG. 5 is a flow diagram illustrating operations 500 for using ML models to create IT infrastructures at a service provider network based on images of IT system architecture diagrams according to some embodiments. Some or all of the operations 500 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by an IT infrastructure modeling service 102, ML service 104, and other service provider network 100 services of the other figures.

The operations 500 include, at block 502, receiving an image depicting a diagram of an IT system. For example, in reference to FIG. 1, an IT infrastructure modeling service 102 can receive an image 112 depicting an IT system diagram. In an embodiment, the image includes at least one graphical element representing one or more of: a physical server, a VM, a container, a serverless function, a load balancer, a database, an object storage resource, an in-memory data storage resource, a logging resource, a public subnet, a private subnet, a VPC configuration, a routing table, a security group, an auto scaling group, a software configuration.

In an embodiment, the image includes at least one graphical element that is associated with an annotation, the annotation including one or more of: an identifier of a type of computing resource represented by the at least one graphical element, an identifier of a number of computing resources represented by the at least one graphical element, one or more configurations associated with a computing resource represented by the at least one graphical element.

The operations 500 further include, at block 504, analyzing the image using at least one ML model to create a structured data representation of the IT system, the structured data representation of the IT system indicating types of computing resources to be used to implement the IT system at the service provider network. In an embodiment, the ML model is a neural network.

In an embodiment, analyzing the image using the at least one ML model to create the structured data representation of the IT system includes: identifying a plurality of graphical elements in the image each representing a component of the IT system, and determining a respective type of computing resource to be used to implement each of the components of the IT system represented by the graphical elements identified in the image.

In an embodiment, the structured data representation is an infrastructure template that describes a respective type of computing resource to be used to implement components of the IT system represented by the diagram.

In one embodiment, the operations further include using the ML model to include in the structed data representation at least one system configuration that is not depicted in the image. For example, the at least one system configuration can include a "best practices" system configuration, or include one or more computing resources offered by a service provider network but not expressly depicted in the diagram.

In one embodiment, the ML model is unable to identify at least one graphical element included in the image, and the operations further include: receiving user input indicating a type of computing resource represented by the at least one graphical element, and using the user input to train the ML model to recognize the at least one graphical element. In one embodiment, the operations further include training the ML model using training data including one or more of graphical element-to-computing resource type mappings, computing resource type-to-service provider network computing resource mappings, computing resource type-to-best practices settings mappings.

In one embodiment, the operations further include receiving operational parameters for the IT system; wherein determining the respective type of computing resource to be used to implement each of the components of the IT system represented by the plurality of graphical elements identified in the image is based at least in part on the operational parameters. For example, the operational parameters can include various types of performance, security, or other types of system parameters, and the computing resources can be selected to satisfy the specified operational parameters.

In one embodiment, the operations further include receiving input representing a single graphical element of the diagram; using the at least one ML model to identify a type of computing resource represented by the single graphical element of the diagram; and sending a standardized graphical element representing the type of computing resource identified by the ML model. For example, the single graphical element may be received from a user device while a user is creating a diagram, and the standardized graphical element can be sent to the user device in response to identifying the single graphical element.

The operations 500 further include, at block 506, configuring a plurality of computing resources at the service provider network based on the structured data representation of the IT system.

Figure 6:
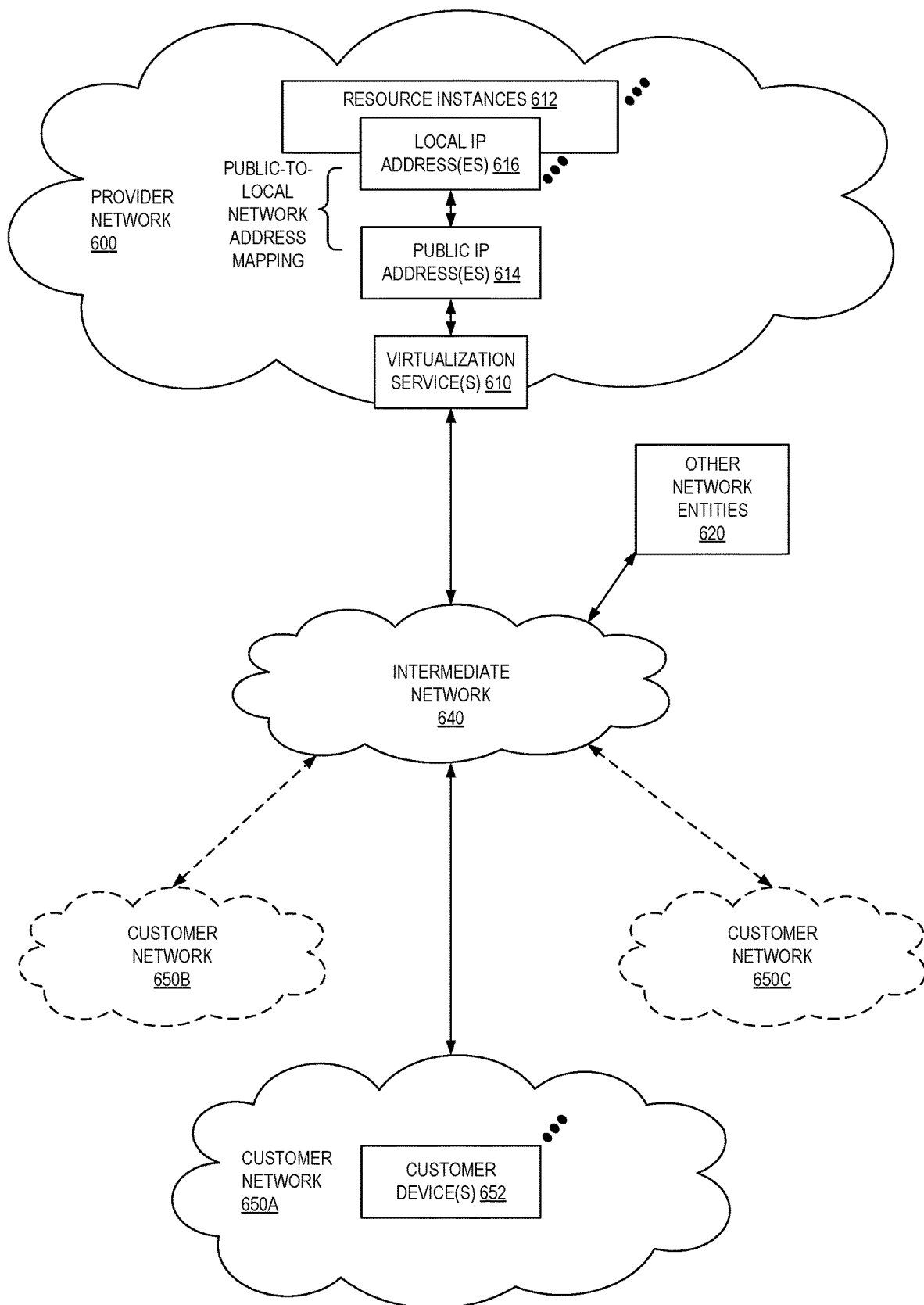
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (for example, Internet Protocol version 4 (IPv4) or Internet Protocol version 6 (IPv6) addresses) that customers may obtain from the provider 600.

Conventionally, the provider network 600, via the virtualization services 610, may allow a customer of the service provider (for example, a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
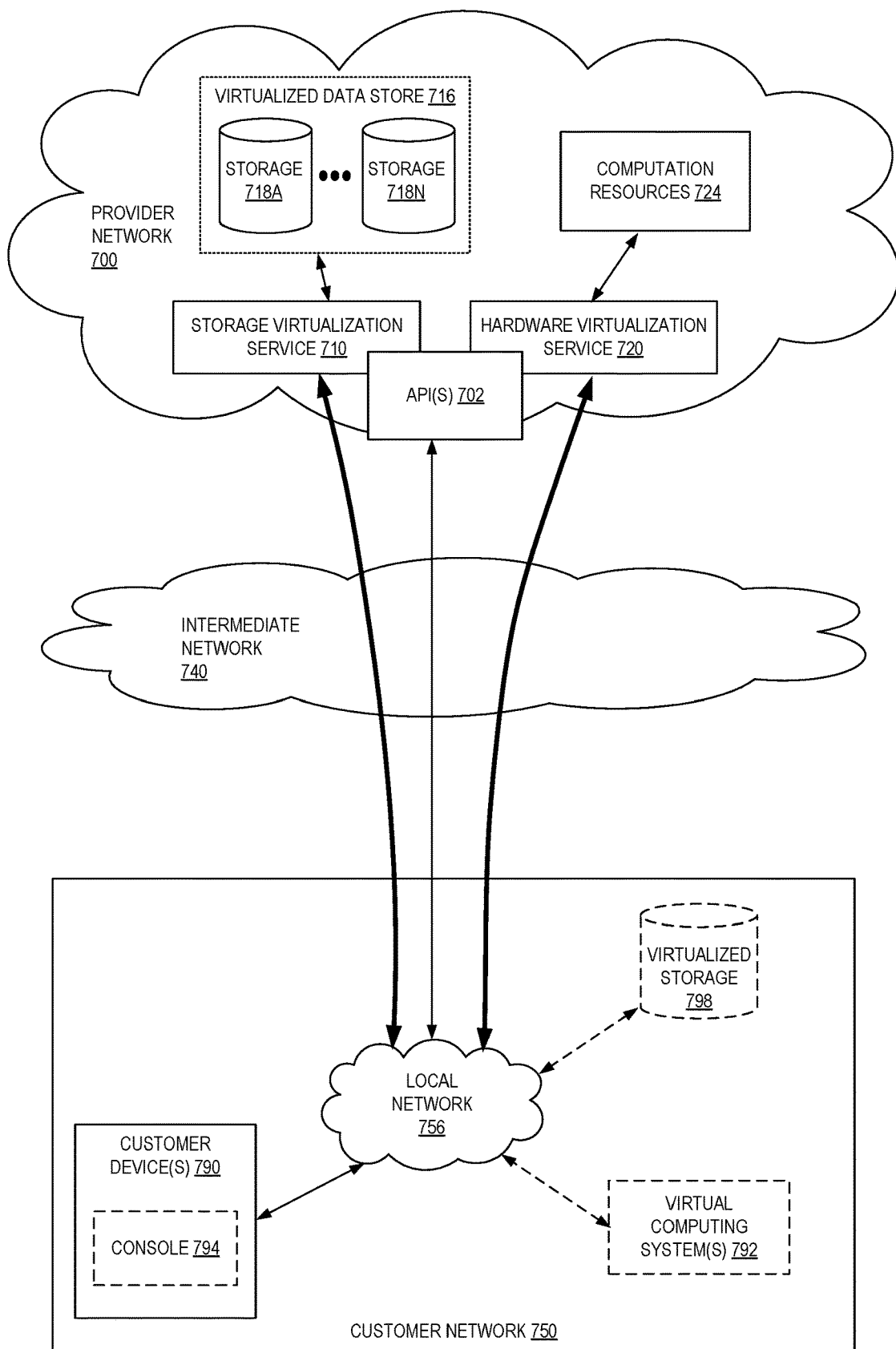
FIG. 7 is a block diagram of an example provider network that provides a storage virtualization service and a hardware virtualization service to customers according to some embodiments.

FIG. 7 is a block diagram of an example provider network that provides a storage virtualization service and a hardware virtualization service to customers, according to some embodiments. Hardware virtualization service 720 provides multiple computation resources 724 (for example, VMs) to customers. The computation resources 724 may, for example, be rented or leased to customers of the provider network 700 (for example, to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (for example, a web-based application, standalone application, mobile application, and so forth). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (for example, via console 794), the customer may access the functionality of storage virtualization service 710, for example via one or more APIs 702, to access data from and store data to storage resources 718A-718N of a virtual data store 716 provided by the provider network 700. In some embodiments, a virtualized data store gateway (not shown) may be provided at the customer network 750 that may locally cache at least some data, for example frequently accessed or critical data, and that may communicate with virtualized data store service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes, which appear to the user as local virtualized storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
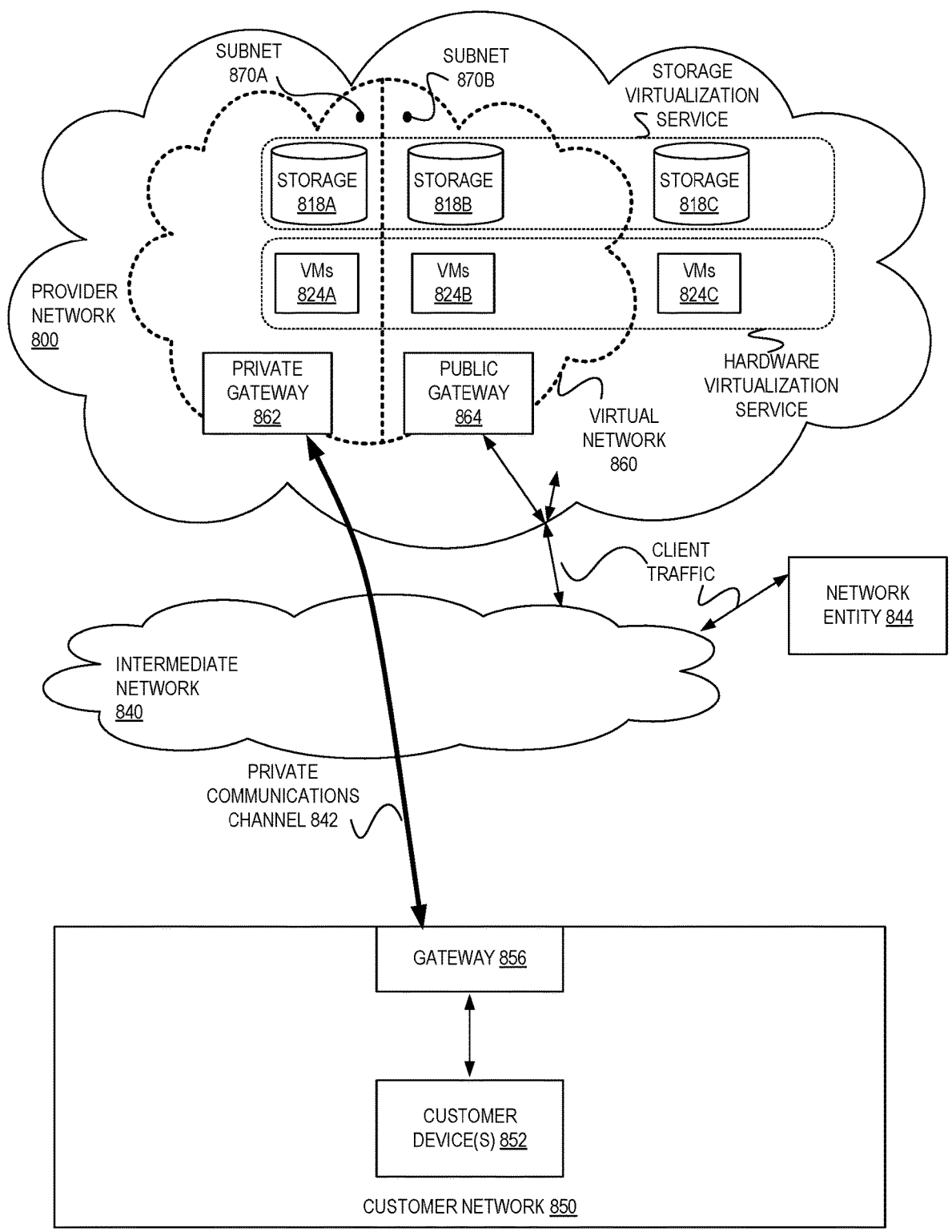
FIG. 8 illustrates an example provider network that provides virtual networks on the provider network to at least some customers according to some embodiments.

FIG. 8 illustrates an example provider network that provides virtual networks on the provider network to at least some customers, according to some embodiments. A customer's virtual network 860 on a provider network 800, for example, enables a customer to connect their existing infrastructure (for example, one or more customer devices 852) on customer network 850 to a set of logically isolated resource instances (for example, VMs 824A and 824B and storage 818A and 818B), and to extend management capabilities such as security services, firewalls, and intrusion detection systems to include their resource instances.

A customer's virtual network 860 may be connected to a customer network 850 via a private communications channel 842. A private communications channel 842 may, for example, be a tunnel implemented according to a network tunneling technology or some other technology over an intermediate network 840. The intermediate network may, for example, be a shared network or a public network such as the Internet. Alternatively, a private communications channel 842 may be implemented over a direct, dedicated connection between virtual network 860 and customer network 850.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 860 for a customer on provider network 800, one or more resource instances (for example, VMs 824A and 824B and storage 818A and 818B) may be allocated to the virtual network 860. Note that other resource instances (for example, storage 818C and VMs 824C) may remain available on the provider network 800 for other customer usage. A range of public IP addresses may also be allocated to the virtual network 860. In addition, one or more networking nodes (for example, routers, switches, and so forth) of the provider network 800 may be allocated to the virtual network 860. A private communications channel 842 may be established between a private gateway 862 at virtual network 860 and a gateway 856 at customer network 850.

In some embodiments, in addition to, or instead of, a private gateway 862, virtual network 860 may include a public gateway 864 that enables resources within virtual network 860 to communicate directly with entities (for example, network entity 844) via intermediate network 840, and vice versa, instead of or in addition to via private communications channel 842.

Virtual network 860 may be, but is not necessarily, subdivided into two or more subnetworks, or subnets, 870. For example, in implementations that include both a private gateway 862 and a public gateway 864, a virtual network 860 may be subdivided into a subnet 870A that includes resources (VMs 824A and storage 818A, in this example) reachable through private gateway 862, and a subnet 870B that includes resources (VMs 824B and storage 818B, in this example) reachable through public gateway 864.

The customer may assign particular customer public IP addresses to particular resource instances in virtual network 860. A network entity 844 on intermediate network 840 may then send traffic to a public IP address published by the customer; the traffic is routed, by the provider network 800, to the associated resource instance. Return traffic from the resource instance is routed, by the provider network 800, back to the network entity 844 over intermediate network 840. Note that routing traffic between a resource instance and a network entity 844 may require network address translation to translate between the public IP address and the local IP address of the resource instance.

Some embodiments may allow a customer to remap public IP addresses in a customer's virtual network 860 as illustrated in FIG. 8 to devices on the customer's external network 850. When a packet is received (for example, from network entity 844), the network 800 may determine that the destination IP address indicated by the packet has been remapped to an endpoint on external network 850 and handle routing of the packet to the respective endpoint, either via private communications channel 842 or via the intermediate network 840. Response traffic may be routed from the endpoint to the network entity 844 through the provider network 800, or alternatively may be directly routed to the network entity 844 by the customer network 850. From the perspective of the network entity 844, it appears as if the network entity 844 is communicating with the public IP address of the customer on the provider network 800. However, the network entity 844 has actually communicated with the endpoint on customer network 850.

While FIG. 8 shows network entity 844 on intermediate network 840 and external to provider network 800, a network entity may be an entity on provider network 800. For example, one of the resource instances provided by provider network 800 may be a network entity that sends traffic to a public IP address published by the customer.

Figure 9:
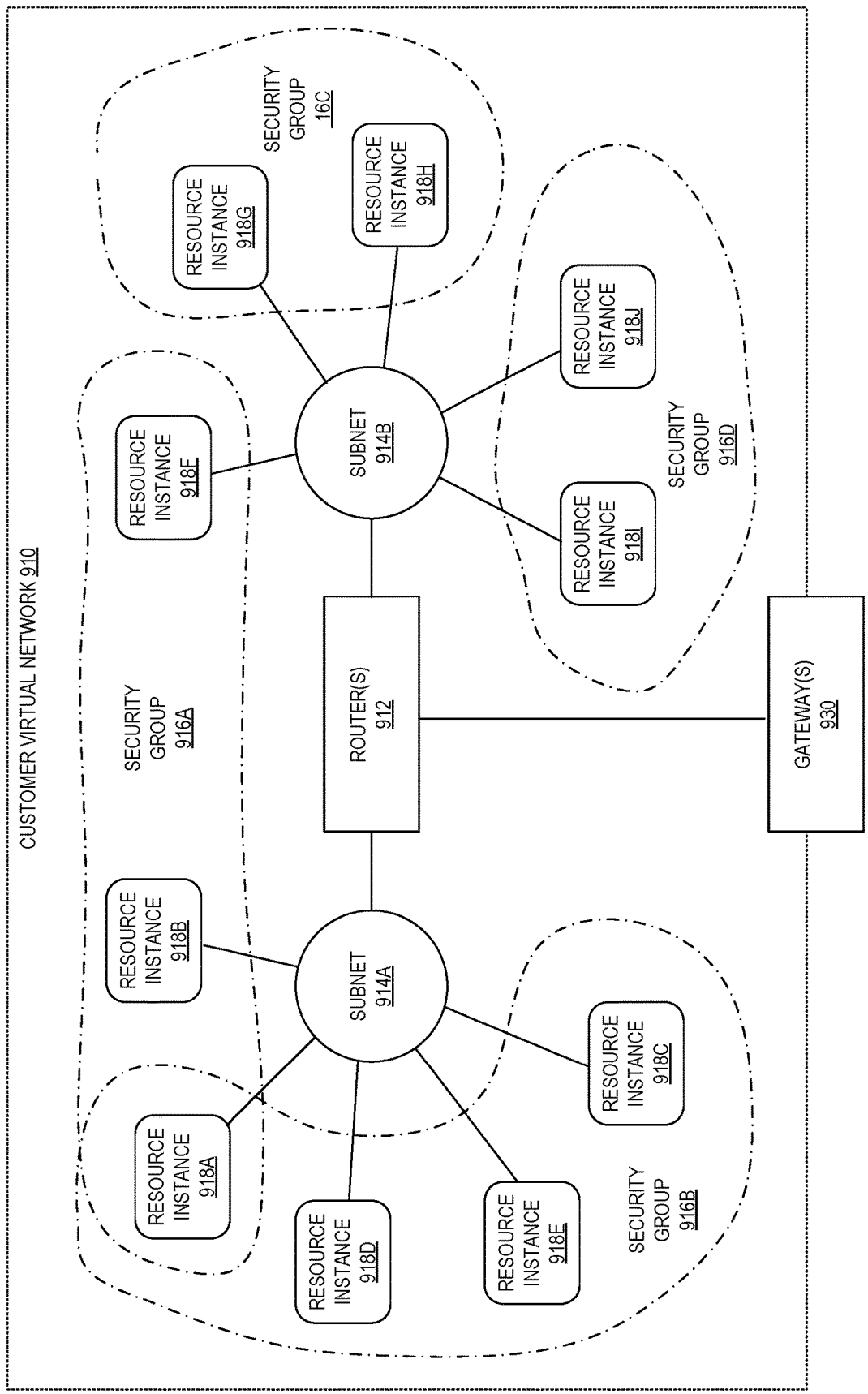
FIG. 9 illustrates subnets and security groups in an example virtual network on a provider network according to some embodiments.

FIG. 9 illustrates subnets and security groups in an example virtual network 910 on a provider network, according to some embodiments. In some embodiments, a provider network such as provider network 800 in FIG. 8 may allow the customer to establish and manage virtual security groups 916 (for example, 916A-916D) within the customer's virtual network 910, within or across subnets 914. A security group 916 is a logical grouping of resource instances 918 and acts as a virtual firewall that controls the traffic allowed to reach one or more resource instances 918 within the security group 916 according to security group rules. The customer may establish one or more security groups 916 within the virtual network 910, and may associate each resource instance 918 in the virtual network 910 with one or more of the security groups 916. In some embodiments, the customer may establish and/or modify rules for each security group 916 that control the inbound traffic allowed to reach the resource instances 918 associated with the security group 916.

In the example virtual network 910 shown in FIG. 9, the virtual network 910 is subdivided into two subnets 914A and 914B. Access to the virtual network 910 is controlled by gateway(s) 930. Each subnet 914 may include at least one router 912 that acts to route traffic to (and from) resource instances 918 on the respective subnet 914. In some embodiments, network access control lists (ACLs) may be used to control access to the subnets 914 at router(s) 912. In the example shown in FIG. 9, resource instances 918A through 918E are on subnet 914A, and resource instances 918F through 918J are on subnet 914B. The customer has established four security groups 916A through 916D. As shown in FIG. 9, a security group may extend across subnets 914, as does security group 916A that includes resource instances 918A and 918B on subnet 914A and resource instance 918F on subnet 914B. In addition, a resource instance 918 may be included in two or more security groups 916, as is resource instance 918A which is included in security group 916A and 916B.

Illustrative System

Figure 10:
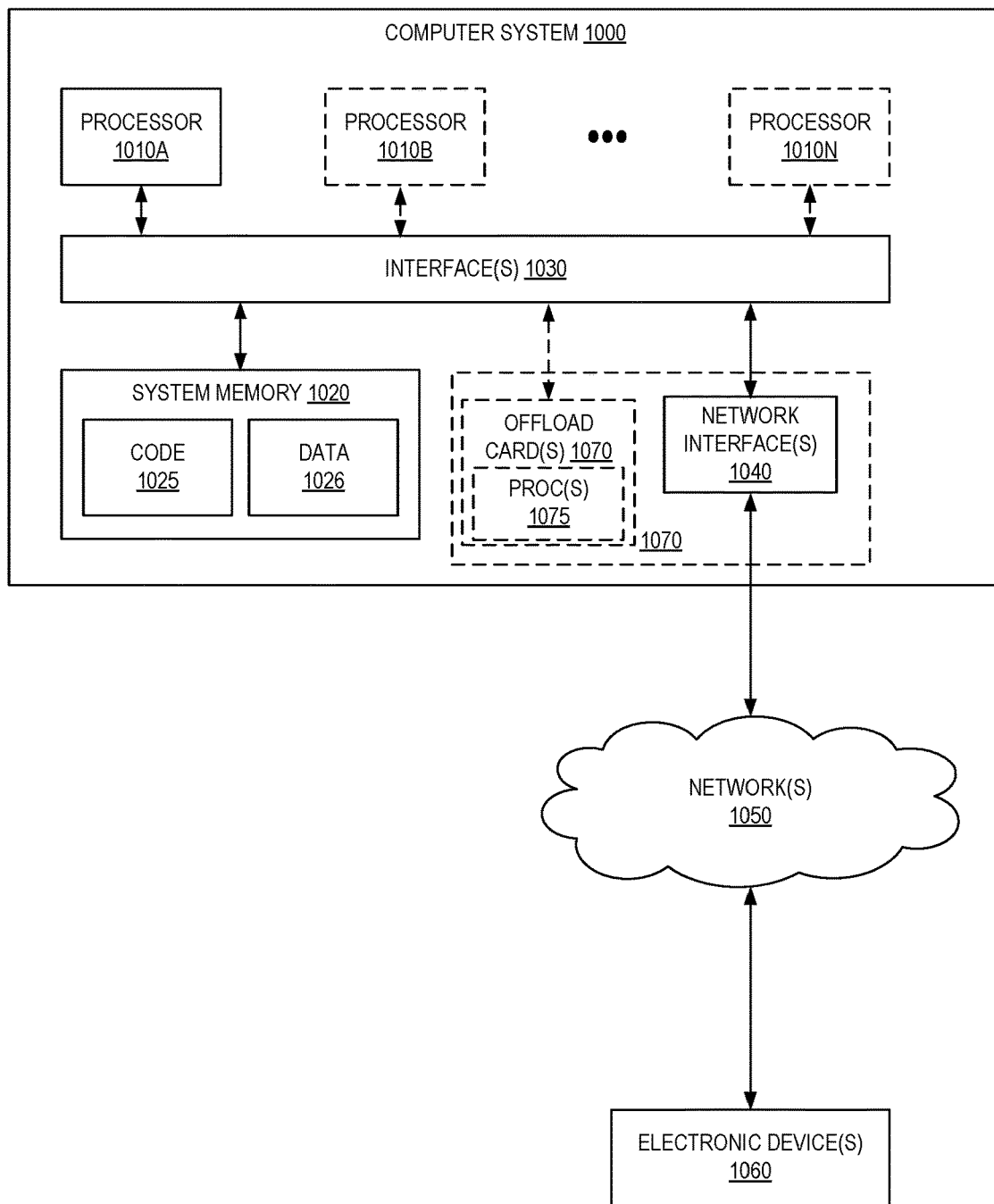
FIG. 10 is a block diagram illustrating an example computer system that may be used in some embodiments.

In some embodiments, a system that implements a portion or all of the techniques for using ML models to create IT infrastructures at a service provider network based on images of IT system architecture diagrams as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (for example, two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (for example, system memory 1020) into a format suitable for use by another component (for example, processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (for example, a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (for example, operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, and so forth. These management operations may, in some embodiments, be performed by the offload card(s) 1070 in coordination with a hypervisor (for example, upon a request from a hypervisor) that is executed by the other processors 1010A-1010N of the computer system 1000. However, in some embodiments the virtualization manager implemented by the offload card(s) 1070 can accommodate requests from other entities (for example, from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, for example, disk or DVD/CD coupled to computer system 1000 via I/O interface 1030. A non-transitory computer-accessible storage medium may also include any volatile or non-volatile media such as RAM (for example, SDRAM, double data rate (DDR) SDRAM, SRAM, and so forth), read only memory (ROM), and so forth, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (for example, large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, 304A-304B) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (for example, A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving an image depicting a diagram of an information technology (IT) system;
using at least one machine learning (ML) model to:
identify a plurality of graphical elements in the image each representing a component of the IT system, and
determine a respective type of computing resource to be used to implement each of the components of the IT system represented by the plurality of graphical elements identified in the image;
generating an infrastructure template describing the respective type of computing resource to be used to implement each of the components of the IT system represented by the graphical elements identified in the image; and
configuring a plurality of computing resources at a service provider network based on the infrastructure template.

2. The computer-implemented method of claim 1, wherein the image includes at least one graphical element representing one of: a physical server, a virtual machine (VM) instance, a container, a serverless function, a load balancer, a database, an object storage resource, an in-memory data storage resource, a logging resource, a public subnet, a private subnet, a virtual private cloud (VPC), a routing table, a security group configuration, an auto scaling group, a software configuration.

3. The computer-implemented method of claim 1, wherein at least one graphical element of the plurality of graphical elements in the image is associated with an annotation, the annotation including one or more of: an identifier of a type of computing resource represented by the at least one graphical element, an identifier of a number of computing resources represented by the at least one graphical element, and one or more configuration settings associated with a computing resource represented by the at least one graphical element.

4. A computer-implemented method comprising:
receiving an image depicting a diagram of an information technology (IT) system;
analyzing the image using at least one machine learning (ML) model to create a structured data representation of the IT system, the structured data representation of the IT system indicating types of computing resources to be used to implement the IT system at a service provider network, and using the at least one ML model to include in the structured data representation at least one system configuration that is not depicted in the image; and
configuring a plurality of computing resources at the service provider network based on the structured data representation of the IT system.

5. The computer-implemented method of claim 4, wherein analyzing the image using the at least one ML model to create the structured data representation of the IT system includes:
identifying a plurality of graphical elements in the image each representing a component of the IT system; and
determining a respective type of computing resource to be used to implement each of the components of the IT system represented by the graphical elements identified in the image.

6. The computer-implemented method of claim 4, wherein the structured data representation is an infrastructure template that describes a respective type of computing resource to be used to implement components of the IT system represented by the diagram.

7. The computer-implemented method of claim 4, wherein the image includes at least one graphical element representing one or more of: a physical server, a virtual machine (VM) instance, a container, a serverless function, a load balancer, a database, an object storage resource, an in-memory data storage resource, a logging resource, a public subnet, a private subnet, a virtual private cloud (VPC), a routing table, a security group, an auto scaling group, a software configuration.

8. The computer-implemented method of claim 4, wherein the image includes at least one graphical element that is associated with an annotation, the annotation including one or more of: an identifier of a type of computing resource represented by the at least one graphical element, an identifier of a number of computing resources represented by the at least one graphical element, one or more configurations associated with a computing resource represented by the at least one graphical element.

9. The computer-implemented method of claim 4, wherein the ML model is unable to identify at least one graphical element included in the image, the method further comprising:
receiving user input indicating a type of computing resource represented by the at least one graphical element; and
using the user input to train the ML model to recognize the at least one graphical element.

10. The computer-implemented method of claim 4, wherein the ML model is a neural network.

11. The computer-implemented method of claim 4, further comprising training the ML model using training data including one or more of graphical element-to-computing resource type mappings, computing resource type-to-service provider network computing resource mappings, computing resource type-to-best practices settings mappings.

12. The computer-implemented method of claim 4, further comprising:
receiving operational parameters for the IT system; and
wherein determining the respective type of computing resource to be used to implement each of the components of the IT system represented by a plurality of graphical elements identified in the image is based at least in part on the operational parameters.

13. The computer-implemented method of claim 4, further comprising:
receiving input representing a single graphical element of the diagram;
using the at least one ML model to identify a type of computing resource represented by the single graphical element of the diagram; and
sending a standardized graphical element representing the type of computing resource identified by the ML model.

14. A system comprising:
an information technology (IT) infrastructure modeling service implemented by a first one or more electronic devices, the IT infrastructure modeling service comprising instructions which, when executed by the first one or more electronic devices, cause the IT infrastructure modeling service to:
receive an image depicting a diagram of an IT system,
send the image to a machine learning (ML) service,
receive a structured data representation of the IT system from the ML service, and
configure a plurality of computing resources at a service provider network based on the structured data representation of the IT system; and
a machine learning (ML) service implemented by a second one or more electronic devices, the ML service including instructions that upon execution cause the ML service to:
receive the image depicting an IT system architecture,
identify a plurality of graphical elements in the image each representing a component of the IT system,
determine a respective type of computing resource to be used to implement each of the components of the IT system represented by the plurality of graphical elements, and
generate a structured data representation of the IT system, the structured data representation indicating types of computing resources to be used to implement the IT system at the service provider network.

15. The system of claim 14, wherein the image includes at least one graphical element representing one or more of: a physical server, a virtual machine (VM) instance, a container, a serverless function, a load balancer, a database, an object storage resource, an in-memory data storage resource, a logging resource, a public subnet, a private subnet, a virtual private cloud (VPC), a routing table, a security group, an auto scaling group, a software configuration.

16. The system of claim 14, wherein the image includes at least one graphical element that is associated with an annotation, the annotation including one or more of: an identifier of a type of computing resource represented by the at least one graphical element, an identifier of a number of computing resources represented by the at least one graphical element, one or more configurations associated with a computing resource represented by the at least one graphical element.

17. The system of claim 14, wherein the ML service further includes instructions that upon execution cause the ML service to include in the structed data representation at least one system configuration that is not depicted in the image.

18. The system of claim 14, the ML service further includes instructions that upon execution cause the ML service to:
receive user input indicating a type of computing resource represented by at least one of the plurality of graphical elements; and
use the user input to train an ML model to recognize the at least one of the plurality of graphical elements.

19. The system of claim 14, wherein the ML service uses an ML model based on a neural network.

20. The computer-implemented method of claim 1, further comprising:
receiving operational parameters for the IT system; and
wherein determining the respective type of computing resource to be used to implement each of the components of the IT system represented by a plurality of graphical elements identified in the image is based at least in part on the operational parameters.

* * * * *